United States Patent
Takahashi et al.

(10) Patent No.: US 6,983,816 B2
(45) Date of Patent: Jan. 10, 2006

(54) VEHICLE STEERING APPARATUS

(75) Inventors: Toshihiro Takahashi, Nishio (JP); Shoji Ogawa, Chiryu (JP); Shinji Takeuchi, Okazaki (JP); Hiroshi Kuroyanagi, Nagoya (JP); Shoji Asai, Nagoya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/824,538

(22) Filed: Apr. 15, 2004

(65) Prior Publication Data
US 2004/0238257 A1 Dec. 2, 2004

(30) Foreign Application Priority Data
Apr. 18, 2003 (JP) .............................. 2003-114737

(51) Int. Cl.
*B62D 5/00* (2006.01)

(52) U.S. Cl. ..................................................... 180/402

(58) Field of Classification Search ................ 180/402, 180/403, 417, 421, 422

See application file for complete search history.

(56) References Cited

U.S. PATENT DOCUMENTS

| 5,097,917 | A | * | 3/1992 | Serizawa et al. | ............ 180/402 |
| 5,896,942 | A | * | 4/1999 | Bohner et al. | ............... 180/402 |
| 6,079,513 | A | * | 6/2000 | Nishizaki et al. | ........... 180/402 |
| 6,138,788 | A | | 10/2000 | Bohner et al. | |
| 6,213,248 | B1 | * | 4/2001 | Kawaguchi et al. | ......... 180/446 |
| 6,273,468 | B1 | | 8/2001 | Bohner et al. | |
| 6,523,637 | B1 | * | 2/2003 | Nakano et al. | .............. 180/402 |
| 6,698,542 | B2 | * | 3/2004 | Nishizaki et al. | ........... 180/403 |

FOREIGN PATENT DOCUMENTS

| DE | 100 32 183 A1 | 1/2002 |
| DE | 102 16 247 A1 | 11/2003 |
| WO | WO 03/024741 A2 | 3/2003 |

* cited by examiner

*Primary Examiner*—Avraham Lerner
(74) *Attorney, Agent, or Firm*—Oblon, Spivak, McClelland, Maier & Neustadt, P.C.

(57) ABSTRACT

A steer-by-wire steering apparatus for a vehicle includes an elastic member couples a reaction force actuator to a steering wheel. With respect to the elastic member, a side closer to the steering wheel is referred to as a primary side, and a side closer to the reaction force actuator is referred to as a secondary side. A steering wheel position detector is located at the secondary side. Therefore, the apparatus is capable of giving a feel of a steering reaction force equivalent to an ordinary mechanically connected steering apparatus to an operator and secures stability of a control system.

10 Claims, 6 Drawing Sheets

VEHICLE STEERING APPARATUS

REFERENCE TO RELATED APPLICATION

This application is based upon and claims the benefit of priority from prior Japanese Patent Application No. 2003-114737, filed on Apr. 18, 2003, the entire contents of which are incorporated herein by reference.

BACKGROUND OF THE INVENTION

The present invention relates to a vehicle steering apparatus, and more particularly, to a steer-by-wire steering apparatus.

As a vehicle steering apparatus for control steered wheels of a vehicle, a steer-by-wire steering apparatus as shown in FIG. 8 is known. In this apparatus, a steering wheel 500 and a steering mechanism 501 connected to steered wheels T (for example, front wheels) are mechanically separated.

In this steering apparatus, the steering wheel 500 and the steering mechanism 501 are not directly connected. A steering angle of the steering wheel 500 is detected, and the steering mechanism 501 is driven by an electric motor 502 in accordance with the detected steering angle. Namely, a rod 510a (steering rod) of the steering mechanism is moved in its axial direction by rotation of the electric motor 502, and the steered wheels T connected to the rod 510a with tie rods and knuckle arms (neither of them are shown) are steered. An elastic member such as a torsion bar (not shown) is coaxially connected to the steering wheel 500 with a steering shaft 503 in between.

A speed reducer 504 having a worm gear combined with a pinion gear, for example, is provided at a lower part at an opposite side of the elastic member from the steering shaft 503, namely, at a secondary side with respect to the elastic member. A reaction force motor 505, which is an electric motor, is connected to the secondary side of the elastic member with the speed reducer 504 in between. The reaction force motor 505 applies a force in the reverse direction (reaction force) from the steering direction to the steering shaft 503 in accordance with the vehicle speed and a road condition, such that an operator feels this reaction force.

In order to steer the steering wheel 500, it is necessary to apply steering torque to resist the reaction torque generated by the reaction force motor 505. A torque sensor 506 is provided at a side of the steering shaft 503 of the above-described elastic member. A detection signal of the torque sensor 506 is outputted to a control circuit 510. A steering wheel angle sensor 507 is provided at the side of the steering shaft 503 with respect to the elastic member, namely, at a primary side of the elastic member, to detect a manipulation amount of the steering wheel 500. The steering wheel angle sensor 507 is closer to the steering wheel 500 than the torque sensor 506 is to the steering wheel 500. A steering wheel angle (turning amount) including the manipulating direction is detected and outputted to a control circuit 510 as a signal expressing a manipulation state of the steering wheel 500 by the steering wheel angle sensor 507.

A rotation angle sensor 509 constituted of a rotary encoder is provided at an output shaft of the electric motor 502 provided at the steering mechanism 501. The rotation angle sensor 509 outputs a rotation angle of the output shaft (not shown) of the electric motor 502, namely, a detection signal indicating a rotation position of the output shaft, to the control circuit 510. The control circuit 510 performs feedback control such as position control to eliminate the deviation between the steered wheel position command based on the steering wheel angle detected by the steering wheel angle sensor 507 and the actual position computed based on the rotation angle detected by the rotation angle sensor 509.

The torque sensor 506 is provided between the steering wheel angle sensor 507 and the reaction force motor 505 in the steer-by-wire steering apparatus for a vehicle constructed as described above. The above-described torque sensor 506 detects torque by detecting a torsion angle of the elastic member such as a torsion bar. Accordingly, if a phase difference occurs between the steering wheel angle sensor 507 and the reaction force motor 505, and thereby a control delay is caused, it has an adverse effect on the control loop of the control circuit 510.

The adverse effect will be explained.

As shown in FIG. 4, the mechanism constituted of the steering wheel 500 and the elastic member 508 such as a torsion bar as described above can be considered to construct a spring vibration system 530.

Specifically, the equation of motion of the spring vibration system 530 is equation (1). Js represents inertia of the steering wheel 500, Ks represents a spring constant of the elastic member 508, Ds represents a viscosity constant of the elastic member 508, Tr represents torque (steering reaction force) generated by the reaction force motor 505, θ1 represents an angle at the primary side of the elastic member 508, and θ2 represents an angle at the secondary side of the elastic member 508.

$$J_s \frac{d^2 \theta_1}{dt^2} = D_s \frac{d}{dt}(\theta_2 - \theta_1) + K_s(\theta_2 - \theta_1) \qquad \text{Equation (1)}$$

When the Laplace transformation of the equation (1) is performed and organized, the relationship between θ1 and θ2 is as follows with the Laplacian operator set as s.

$$\theta_1(s) = \frac{\frac{D_s}{J_s}s + \frac{K_s}{J_s}}{s^2 + \frac{D_s}{J_s}s + \frac{K_s}{J_s}} \theta_2(s) \qquad \text{Equation (2)}$$

The frequency characteristic of equation (2) is as shown in FIGS. 5(a) and 5(b), and θ1 sometimes generates large phase delay with respect to θ2. FIG. 5(a) shows the frequency characteristic of the spring vibration system 530, the vertical axis represents a magnitude, and horizontal axis represents a frequency. FIG. 5(b) shows the frequency characteristic of the spring vibration system 530, the vertical axis represents a phase, and the horizontal axis represents a frequency.

A block diagram of a control system shown in FIG. 8, which includes the spring vibration system 530 (secondary vibration system) as described above is shown in FIG. 6. In FIG. 6, reference character Jh denotes inertia of the reaction force motor 505, and reference character Kr denotes an effect of the steered wheels T (tires) and the road (expressed by the equivalent spring). Reference character G denotes a gear ratio of the steering apparatus, and reference character Gm denotes a gradient coefficient of the reaction force map for weighting.

A steering wheel angle θh detected at the primary side of the elastic member 508 is converted into a steering position command xrd in accordance with the gear ratio G, and steering control is performed by a steering control system 540. In FIG. 6, reference character xr denotes a steered position at which the steered wheels T are positioned by the electric motor 502, or the steering motor. Meanwhile, a steering rod force Fr which the steering rod receives from the road is converted into a steering reaction force command Trd in accordance with the gear ratio G and the reaction force map M, and the steering reaction force Tr is returned to the steering wheel 500 by a reaction force control system 550.

In FIG. 6, the characteristic from the steering reaction force Tr to the steering wheel angle θh is the secondary vibration system explained in FIG. 4, FIG. 5(a) and FIG. 5(b). Therefore, when the operator takes his or her hands off the steering wheel 500, the phase of the steering wheel angle θh (=angle θ1 of the primary side of the elastic member 508) is considerably delayed with respect to the angle θ2 at the secondary side of the elastic member 508 on which the steering reaction force Tr acts, as described above. Due to the phase delay, the closed loop system of the entire steering apparatus can be unstable in the construction in FIG. 6, and vibration occurs to the entire system. The value of the reaction force map M cannot be increased, and therefore the steering apparatus is inferior in the feel of the steering reaction force than ordinary mechanically connected steering apparatus.

SUMMARY OF THE INVENTION

An objective of the present invention is to provide a steer-by-wire steering apparatus for a vehicle, which apparatus is capable of giving a feel of a steering reaction force equivalent to an ordinary mechanically connected steering apparatus to an operator and secures stability of a control system.

To achieve the above-mentioned objective, the present invention provides a steering apparatus for a vehicle having a steering wheel. The apparatus includes a steering mechanism that is mechanically separate from the steering wheel. The steering mechanism includes a steering rod and a steering actuator. The steering actuator drives the steering rod. A steering wheel position detector detects a steering position of the steering wheel. A control system determines a target steered position of the steering rod based on the detected steering position of the steering wheel. The control system performs feedback control of the steering actuator based on the target steered position and an actual steered position of the steering rod. A reaction force actuator applies reaction force to the steering wheel based on force that the steering mechanism receives from a road. An elastic member couples the reaction force actuator to the steering wheel. The elastic member is located between the steering wheel and the reaction force actuator. With respect to the elastic member, a side closer to the steering wheel is referred to as a primary side, and a side closer to the reaction force actuator is referred to as a secondary side. The steering wheel position detector is located at the secondary side.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
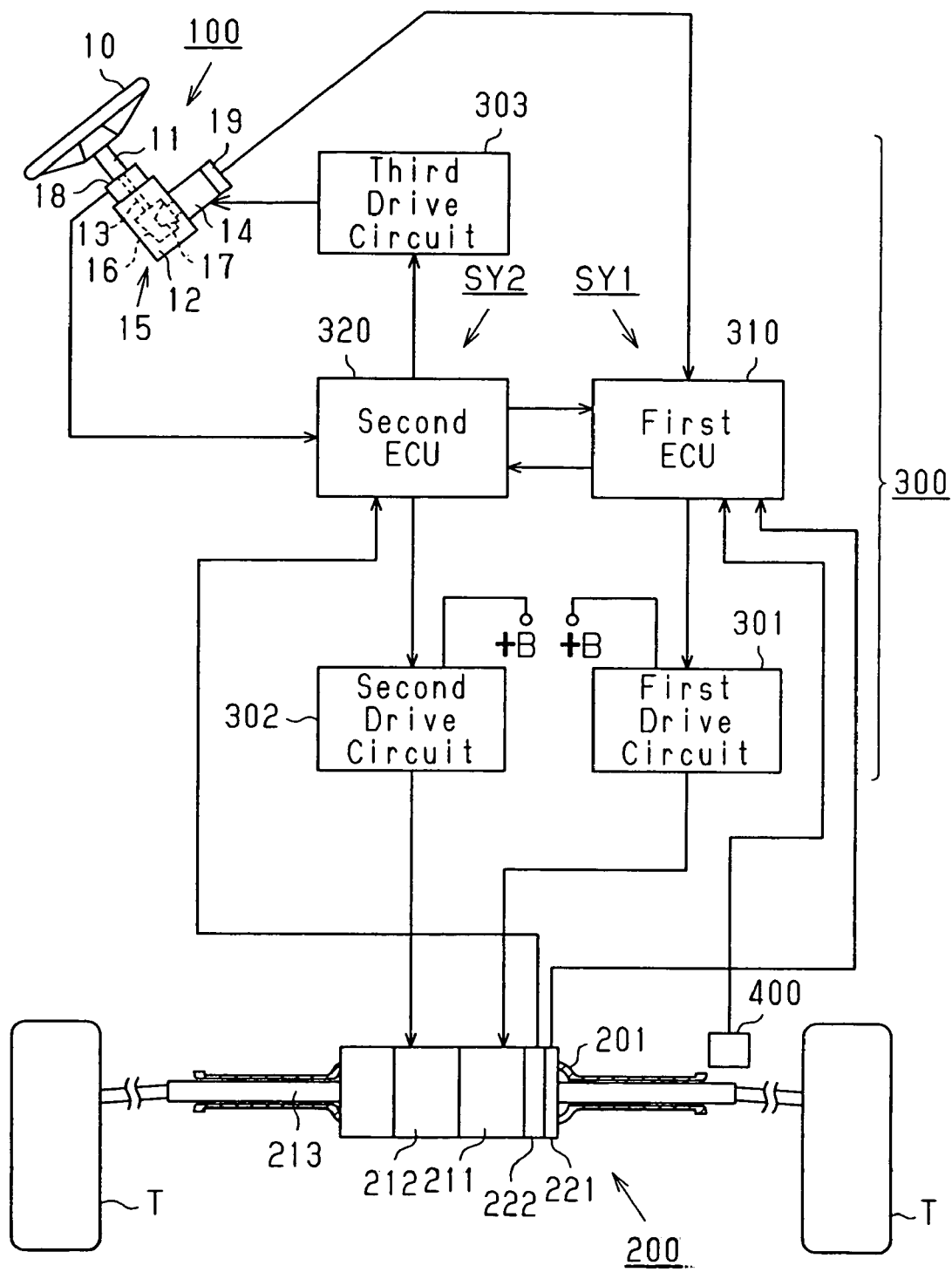
FIG. 1 is a schematic diagram showing an entire steering apparatus according to a first embodiment of the present invention.

In the drawings, like numerals are used for like elements throughout.

A first embodiment of the present invention will be described with reference to FIG. 1 and FIG. 2.

FIG. 1 shows a steer-by-wire steering apparatus for a vehicle. The apparatus is mounted on a vehicle and has a manipulation mechanism 100 including a steering wheel 10, a steering mechanism 200, and a control section 300.

The steering wheel 10 of the manipulation mechanism 100 is connected to a steering shaft 11 rotatably supported by the vehicle (not shown). A torsion bar 13 as an elastic member housed in a housing 12 is connected to a lower portion of the steering shaft 11. A reaction force motor 14 as a reaction force actuator is fixed to a side portion of the housing 12. The reaction force motor 14 is a three-phase blushless DC motor in this embodiment. An output shaft of the reaction force motor 14 is coupled to the torsion bar 13 via a speed reducing mechanism 15 as speed reducing means. The speed reducing mechanism 15 includes a large gear 16 provided at the lower portion of the torsion bar 13, and a small gear 17 provided at the output shaft of the reaction force motor 14 to be meshed with the large gear 16. The speed reducing mechanism 15 may be any mechanism as long as the output shaft of the reaction force motor 14 rotates with the torsion bar 13 and the speed reducing mechanism 15 when the steering wheel 10 is steered.

The side of the torsion bar 13 at the steering wheel 10 will be referred to as a primary side, and the side of the torsion bar 13 at the reaction force motor 14 will be referred to as a secondary side with the torsion bar 13 as the reference, hereunder.

The torsion bar 13 is provided with a torque sensor 18, so that the steering torque is detectable. The torque sensor 18 functions as a torque detector. The torque sensor 18 is electrically connected to a second electronic control unit (ECU) 320 of a second system SY2.

The reaction force motor 14 is provided with a rotation angle sensor 19 as a steering wheel position detector, so that the rotation angle of its output shaft is detectable in an absolute angle. In this embodiment, the rotation angle sensor 19 is disposed at the side of the outer end portion of the reaction force motor 14. The rotation angle sensor 19 is connected to a first electronic control unit (ECU) 310 of a first system SY1. The rotation angle sensor 19 includes a pulse encoder in this embodiment.

(Steering Mechanism 200)

The steering mechanism 200 includes a steering mechanism housing 201, a first steering motor 211, and a second steering motor 212. The housing 201 is supported by the vehicle body. The steering motors 211, 212 are three-phase brushless DC motors and function as steering actuators. The steering motors 211, 212 are located on a common axis. Although not illustrated, the steering motors 211, 212 each include a stator located on the inner surface of the housing 201. The steering motors 211, 212 include a common cylindrical steering rotor that rotates with respect to the stators of the steering motors 211, 212. A steering rod 213 extends through the steering rotor. The steering rod 213 does not rotate about its axis but reciprocates along the axis. Rotation of the steering rotor is converted to a linear motion of the steering rod 213 by a conventional motion conversion mechanism. In this embodiment, the motion conversion mechanism is a ball screw mechanism.

At each end of the steering rod 213, a tie rod and a knuckle arm (neither is shown) are provided. Linear motion of the steering rod 213 is transmitted to left and right front wheels of the vehicle, or steered wheels T, with the tie rods and the knuckle arms. Accordingly, the angle of the steered wheels T is changed.

A first rotation angle sensor 221 detects a rotation angle of the first steering motor 211, and a second rotation angle sensor 222 detects a rotation angle of the second steering motor 212. The rotation angle sensors 221, 222 each include a rotary encoder. The rotation angle sensors 221, 222 and the steering motors 211, 212 are arranged along the axis of the steering rotor.

As the steering rotor rotates, the first rotation angle sensor 221 generates a two-phase pulse train signal and a zero-phase pulse train signal, and sends the signals to the first ECU 310. The second rotation angle sensor 222 generates a two-phase pulse train signal and a zero-phase pulse train signal, and sends the signals to the second ECU 320. The two-phase pulse train signal includes two pulse train signals the phases of which are displaced by $\pi/2$ with respect to each other. The zero-phase pulse train signal represents a reference rotation position of the steering rotor. Detection signals (two-phase pulse train signals and zero-phase pulse train signals) generated by the sensors 221, 222 are sampled at a predetermined sampling period and then sent to the corresponding one of the ECUs 310, 320.

Based on the received detection signals, the first ECU 310 and the second ECU 320 compute a rotation angle of the steering rotor relative to the stators in the steering motors 211, 212. The computed rotation angle is correlated with an actual steered wheel angle, which is the actual value of the angle of the steered wheels T, or with the actual position of the steered wheels T. The actual position, or the actual steered wheel angle, corresponds to the steering position of the steering mechanism 200. A speed sensor 400 detects a speed of the vehicle when traveling, and sends a speed signal into the first ECU 310 of the control section 300.

(Control Section 300)

Next, the control section 300 as a control system will be explained.

The control section 300 includes the first ECU 310, the second ECU 320, a first drive circuit 301, a second drive circuit 302 and a third drive circuit 303. The first drive circuit 301, the second drive circuit 302 and the third drive circuit 303 each includes an inverter. The first drive circuit 301 and the second drive circuit 302 drive steering motors 211 and 212, respectively. As shown in FIG. 2, a current sensor 316 and a current sensor 326 are provided to detect an actual motor current of each phase of the steering motors 211 and 212. The third drive circuit 303 drives the reaction force motor 14. As shown in FIG. 2, a current sensor 327 is provided to detect an actual motor current of each phase of the reaction force motor 14.

The first ECU 310 and the second ECU 320 each includes a microcomputer.

The first system SY1 includes the first ECU 310, the rotation angle sensor 19, the first drive circuit 301, and the steering motor 211. The second system SY2 includes the second ECU 320, the second drive circuit 302, and the steering motor 212.

The first ECU 310 of the first system SY1 determines a target position of the steered wheels T based on the rotation angle detected by the rotation angle sensor 19, determines a torque command $\Delta P$ based on the deviation between the target position (target steered wheel angle) and the actual steered angle of the steered wheels T, and distributes the torque command $\Delta P$ to the distributed torque commands $\Delta P1$ and $\Delta P2$ at a predetermined distribution ratio. Each ECU 310, 320 of both systems SY1, SY2 controls the steering motors 211 and 212 based on the distributed torque commands $\Delta P1$, $\Delta P2$, respectively.

The operation will now be described in detail.

(First ECU 310)

Figure 2:
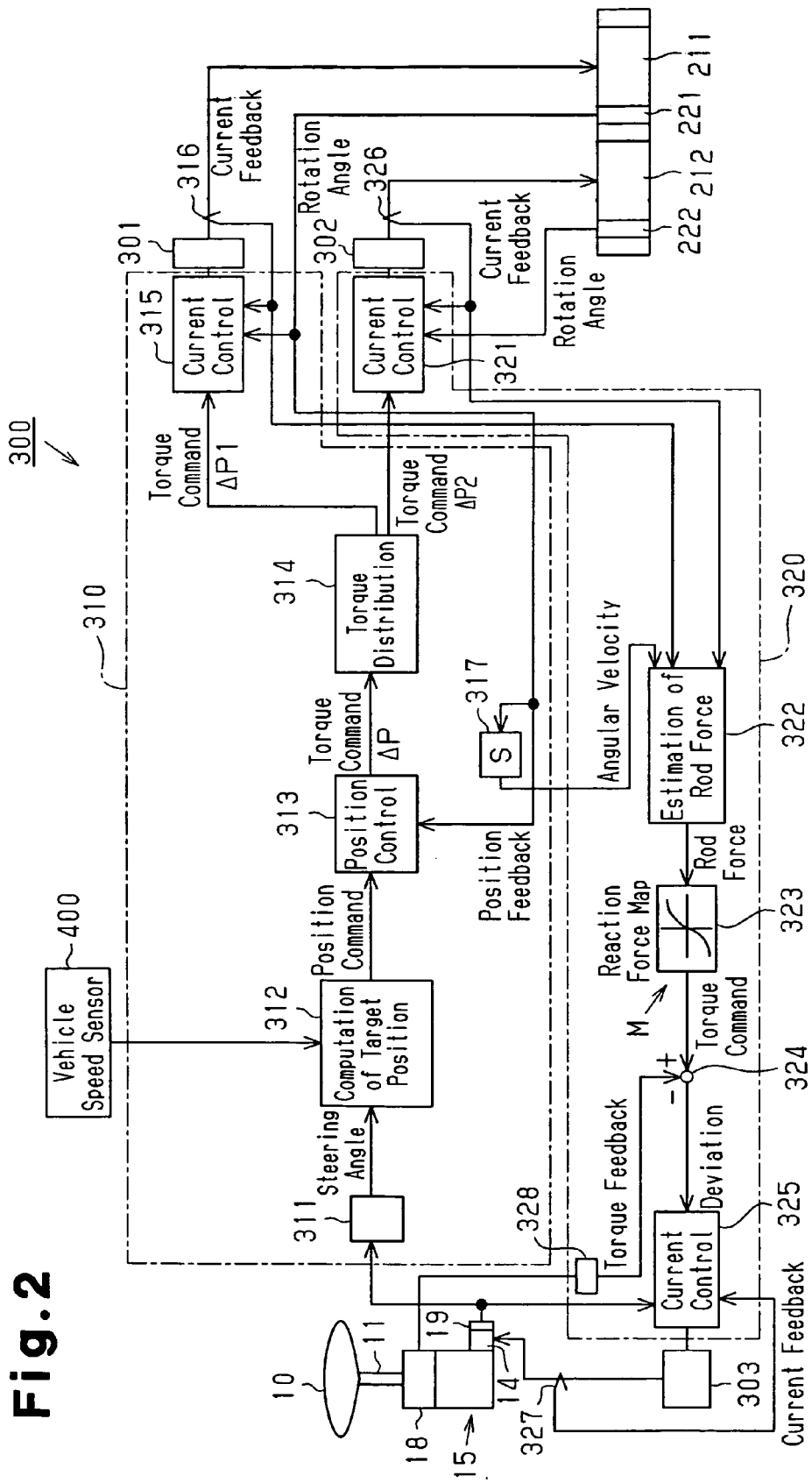
FIG. 2 is a schematic diagram showing a control block of the steering apparatus in FIG. 1.

In the first ECU 310, means (sections) realized by the first ECU 310 in accordance with the above-described control program are shown inside an alternate long and short dashed line in FIG. 2. The sections include a steering wheel angle computing section 311, a target position computing section 312, a position control section 313, a torque distributing section 314, and a current control section 315. In FIG. 2, the first ECU 310 and the second ECU 320 defined by alternate long and short dashed lines do not represent hardware structures, but represent control blocks.

The first ECU 310 performs steering control of the steering motor 211 with the first drive circuit 301 so as to obtain the steered wheel angle (the steered angles of the steered wheels T) corresponding to the steering wheel angle calculated based on the rotation angle detected by the rotation angle sensor 19, and so as to obtain a thrust required for the rod 213.

Specifically, when the steering wheel 10 is turned, the steering wheel angle computing section 311 computes a steering wheel angle (steering wheel position) from the straight-ahead position (neutral position) of the steering wheel 10 based on the rotation angle detected by the rotation angle sensor 19. In this case, the steering wheel angle computing section 311 computes the aforesaid steering wheel angle by dividing the rotation angle of the rotation angle sensor 19 by the speed reduction ratio of the speed reducing mechanism 15. The target position computing section 312 sets the transmission ratio corresponding to the vehicle speed based on a vehicle speed signal from the aforesaid vehicle speed sensor 400, then generates a steered wheel position command indicating the target steered wheel positions (target steered wheel angles) of the steered wheels T based on the set transmission ratio and the aforesaid steering wheel angle, and outputs the steered wheel position command to the position control section 313. The target steered wheel angles of the steered wheels T correspond to a target axial position of the rod 213, or a target steering position. As for the aforesaid transmission ratio, the larger the vehicle speed is, the smaller the target steered wheel angle is set with respect to the steering wheel angle. The transmission ratio corresponds to the gear ratio of the aforesaid prior art. The steered wheel position command is sent to the position control section 313, and a detection signal (rotation angle) from the first rotation angle sensor 221 is also sent to the position control section 313, and the position control section 313 computes the actual positions (actual steered wheel angle) of the steered wheels T corresponding to the actual steered position of the steering rod 213.

The position control section 313 computes the deviations between the computed actual positions (actual steered wheel angle) of the steered wheels T and the steered wheel position commands of the steered wheels T (target positions, namely, the target steered wheel angles), multiplies the deviations by a predetermined gain required for the position control, and sends the multiplied values as torque commands $\Delta P$ (current commands) to the torque distributing section 314. Accordingly, in the position control section 313, the position feedback control is performed to eliminate the deviation between the target steered wheel angle and the actual steered wheel angle (feedback value) of the steered wheels T. The aforesaid torque commands $\Delta P$ (current commands) are specifically the current commands of the d-axis and the q-axis. As described above, the first ECU 310 of the control section 300 includes a control loop, namely, a position loop, which performs position control in accordance with the detection signal (rotation angle) obtained by the first rotation angle sensor 221.

The torque distributing section 314 divides the supplied torque command $\Delta P$ at a predetermined distribution ratio, and supplies the distributed torque command $\Delta P1$ (current commands of the d-axis and the q-axis) to the current control section 315 of the first system SY1 and the distributed torque command $\Delta P2$ (current commands of the d-axis and the q-axis) to the current control section 321 of the second system SY2. In this embodiment, the distribution ratio at the time of the start of the engine (starting time control mode) is 50:0 (=$\Delta P1:\Delta P2$); the distribution ratio of the control in the normal state of the vehicle (normal control mode) is 50:50 (=$\Delta P1:\Delta P2$).

The steering control of the steering motor 211 by the first ECU 310 includes the position control for performing control such that the steered wheel angle corresponds to the steering wheel angle, and the torque control to obtain a thrust required by the rod 213, namely, output torque. The current control section 315 performs torque control.

In the starting time control mode and the normal control mode, the current control section 315 receives the distributed torque command $\Delta P1$, the detection signal (rotation angle) of the first rotation angle sensor 221, and the actual motor current of each phase of the steering motor 211 detected by the current sensor 316.

The current control section 315 refers to the detection signal (rotation angle) of the first rotation angle sensor 221, and converts the actual motor current of the aforesaid each phase into a two-phase current, thereby obtaining actual currents of the d-axis and q-axis. The current control section 315 computes the deviations between the distributed torque command $\Delta P1$ (current commands of the d-axis and the q-axis) and the actual currents of the d-axis and the q-axis, respectively. The current control section 315 subjects the deviations to proportional-plus-integral control to obtain the voltage command values of the d-axis and the q-axis, and converts the voltage command values of the d-axis and the q-axis to a three-phase voltage command. Based on the three-phase voltage command, the current control section 315 outputs a PWM motor drive signal. The first drive circuit 301 is controlled by the motor drive signal outputted from the first ECU 310 and performs switching, repeatedly supplies and stops current (PWM control) to the steering motor 211, and supplies the motor driving current corresponding to the distributed torque command $\Delta P1$ to drive the steering motor 211. The first ECU 310 of the control section 300 has the control loop in which the first ECU 310 controls the torque of the first steering motor 211 by the actual motor current of each phase of the steering motor 211, which is obtained from the current sensor 316. This control loop is referred to as a current loop.

(Second ECU 320)

Each means (each section) realized by the second ECU 320 in accordance with the control program of the second ECU 320 is shown in a block defined by alternate long and short dashed line shown in FIG. 2. The sections include the current control section 321, a rod force estimating section 322, a reaction torque command generating section 323, a subtractor 324, and a current control section 325.

In the starting time control mode and the normal control mode, the current control section 321 receives the distributed torque command $\Delta P2$, the detection signal (rotation angle) of the second rotation angle sensor 222 and the actual motor current of each phase of the steering motor 212 detected by the current sensor 326.

The current control section 321 controls current by referring to the detection signal (rotation angle) of the second rotation angle sensor 222, converts the actual motor current of the aforesaid each phase into two-phase, and obtains the actual currents of the d-axis and the q-axis as the current control section 315. The current control section 321 computes the deviations between the distributed torque command $\Delta P2$ (the current commands of the d-axis and the q-axis) and the actual currents of the d-axis and the q-axis, respectively. The current control section 321 subjects the aforesaid deviations to proportional-plus-integral control to obtain the voltage command values of the d-axis and the q-axis, and converts the voltage command values of the d-axis and the q-axis into a three-phase so as to obtain a three-phase voltage command. Based on the three-phase voltage command, the current control section 321 outputs a PWM motor drive signal. The second drive circuit 302 is controlled by the motor drive signal outputted from the second ECU 320 and performs switching, repeatedly supplies and stops current (PWM control) to the steering motor 212, and supplies the motor driving current corresponding to the distributed torque command $\Delta P2$ to rotationally drive the steering motor 212. As described above, the second ECU 320 of the control section 300 has the control loop in which the second ECU 320 controls the torque by the actual motor current of each phase of the steering motor 212, which is obtained from the current sensor 326. This control loop is referred to as a current loop.

As described above, the steering motors 211 and 212 are controlled by combining the outputs of these actuators, such that the steered wheels T are steered to the target steered wheel angle in the steering mechanism 200.

Although the above-described explanation is about the control of both steering actuators when both the systems SY1 and SY2 are normal, the control program is executed so that when one of the systems SY1 and SY2 fails, the ECU of the remaining normal system realizes the functions of the steering wheel angle computing section 311 to the torque distributing section 314. In this case, the detection signal inputted into the each system from each sensor such as the torque sensor 18 and the rotation angle sensor 19 are transmitted to the ECU of the normal system from the ECU of the failed system. The normal system controls the output of the steering actuator as a control target to be higher than when both the systems are normal.

(Application of Reaction Force)

Next, a configuration will be described in which reaction force is applied to the steering wheel 10.

The differentiator 317 of the first ECU 310 differentiates a rotation angle detected by the first rotation angle sensor 221 to obtain an angular velocity. The angular velocity is sent to the rod force estimating section 322 of the second ECU 320. The current sensor 316 and 326 send the corresponding actual motor current value of each phase of the steering motor 211 and 212 to the rod force estimating section 322.

Based on the angular velocity and the actual current values of each phase of the steering motors 211, 212, the rod force estimating section 322 computes (estimates) a steering rod force applied to the rod 213.

The steering motors 211 and 212 are three-phase blushless DC motors, and the magnitude of the load is proportional to the magnitude of the load current (actual motor current of each phase) of the steering motors 211 and 212. Therefore, the load condition of steering can be detected based on the load current detected by the current sensors 316 and the current sensor 326. In other words, the steering rod force received from the road side and acting on the rod 213 acts as the load on the steering motors 211 and 212, and therefore the rod force estimating section 322 estimates the load condition of the steering based on the magnitude (load current) of the load exerted on the steering motors 211 and 212. In this case, the aforesaid load condition changes in accordance with the accelerating states of the steering motors 211 and 212, and therefore the rod force estimating section 322 corrects the load condition of each motor by using the angular velocity information of the steering motors 211 and 212 and computes the steering rod force.

The reaction torque command generating section 323 refers to the reaction force map M stored in storing means not shown and obtains the target current required to obtain the reaction force as the reaction force command torque based on the aforesaid rod force computed by the rod force estimating section 322, and outputs the obtained reaction force command torque (target current) to a subtractor 324 as the torque command. A torque current converting section 328 converts the steering torque detected by the torque sensor 18 into the current value and outputs the current value to the subtractor 324.

The subtractor 324 computes the deviation between the current value (corresponding to the steering torque) inputted from the torque current converting section 328 and the torque command, and applies the deviation to a current control section 325 as a current command (including the current commands for the d-axis and the q-axis) to the reaction force motor 14. In other words, torque feedback control is performed. In this manner, the second ECU 320 of the control section 300 includes a control loop for performing torque feedback control.

The current control section 325 receives a current command of the aforesaid reaction torque, the rotation angle detected by the rotation angle sensor 19, and the actual motor current of each phase of the reaction force motor 14 detected by a current sensor 327.

The current control section 325 refers to the rotation angle of the rotation angle sensor 19, and converts the actual motor current of the aforesaid each phase into a two-phase current, thereby obtaining actual currents of the d-axis and the q-axis. The current control section 325 computes the deviations between the current command of the reaction torque (including the current commands of the d-axis and the q-axis) and the actual currents of the d-axis and the q-axis respectively. The current control section 325 subjects the deviations to proportional-plus-integral control to compute voltage command values of the d-axis and the q-axis, and converts the voltage command values of the d-axis and the q-axis to the three-phases voltage commands. Based on this three-phase voltage command, a PWM motor drive signal is outputted. The third drive circuit 303 is controlled by the motor drive signal outputted from the second ECU 320 and performs switching, and repeatedly supplies and stops current to the reaction force motor 14 (PWM control) to supply a motor drive current corresponding to the current command to rotate the reaction force motor 14. In this manner, the second ECU 320 of the control section 300 includes the control loop in which the second ECU 320 performs torque control by the actual motor current of each phase of the reaction force motor 14 obtained by the current sensor 327. This control loop is referred to as a current loop.

In this manner, the reaction force motor 14 is controlled, and the reaction force motor 14 applies a reaction torque to the steering wheel 10, in which the direction of the reaction torque is opposite to the steering direction. As a result, to turn the steering wheel 10, the operator needs to apply a turning torque to the steering wheel 10 against the reaction force generated by the reaction force motor 14.

Figure 6:
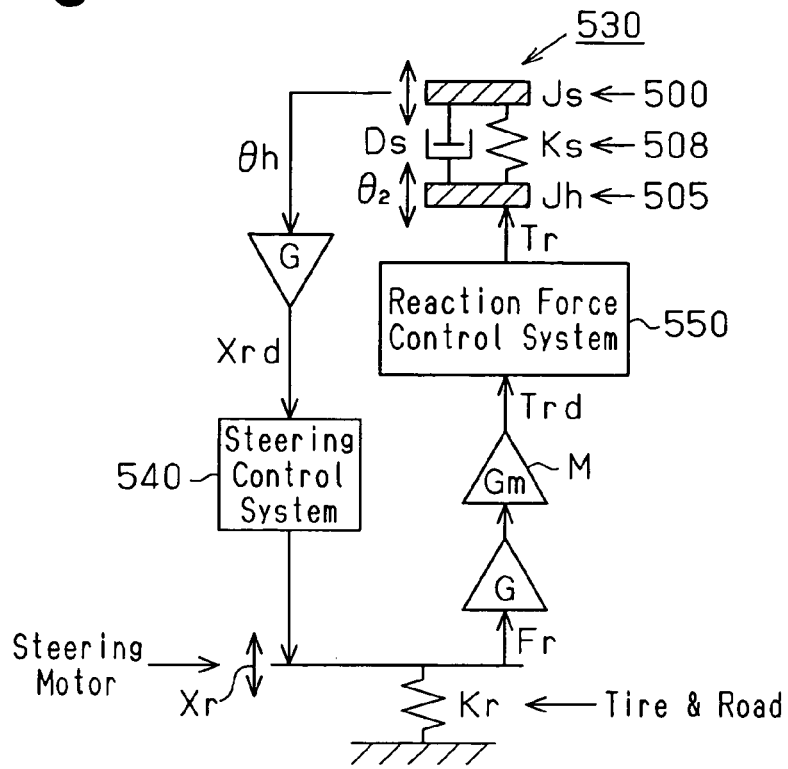
FIG. 6 is a block diagram showing a control system when a steering wheel angle is detected at a primary side of an elastic member.
Figure 7:
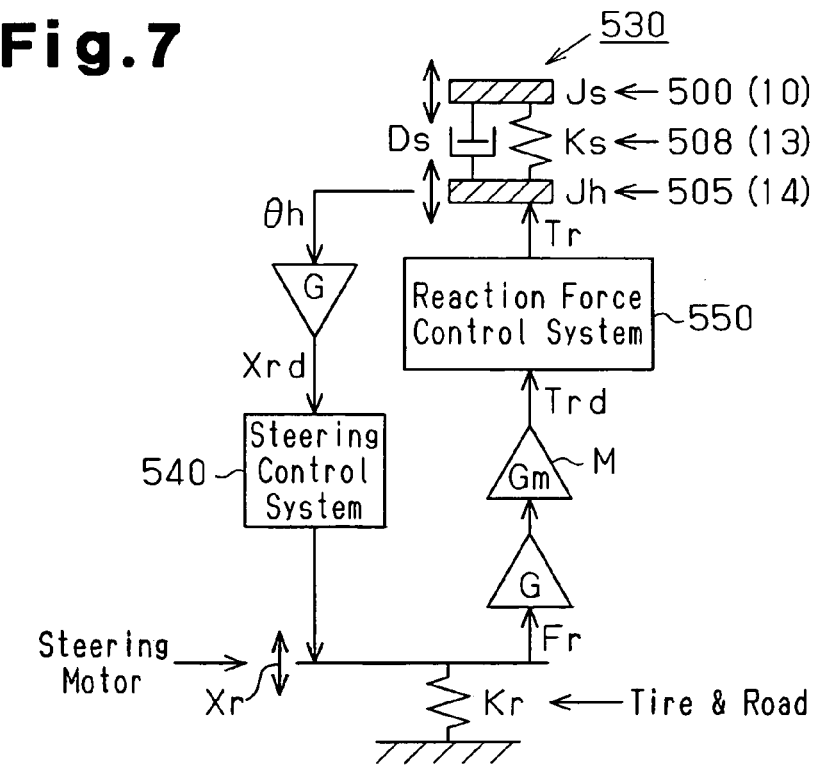
FIG. 7 is a block diagram showing the control system when the steering wheel angle is detected at a secondary side of the elastic member.
Figure 8:
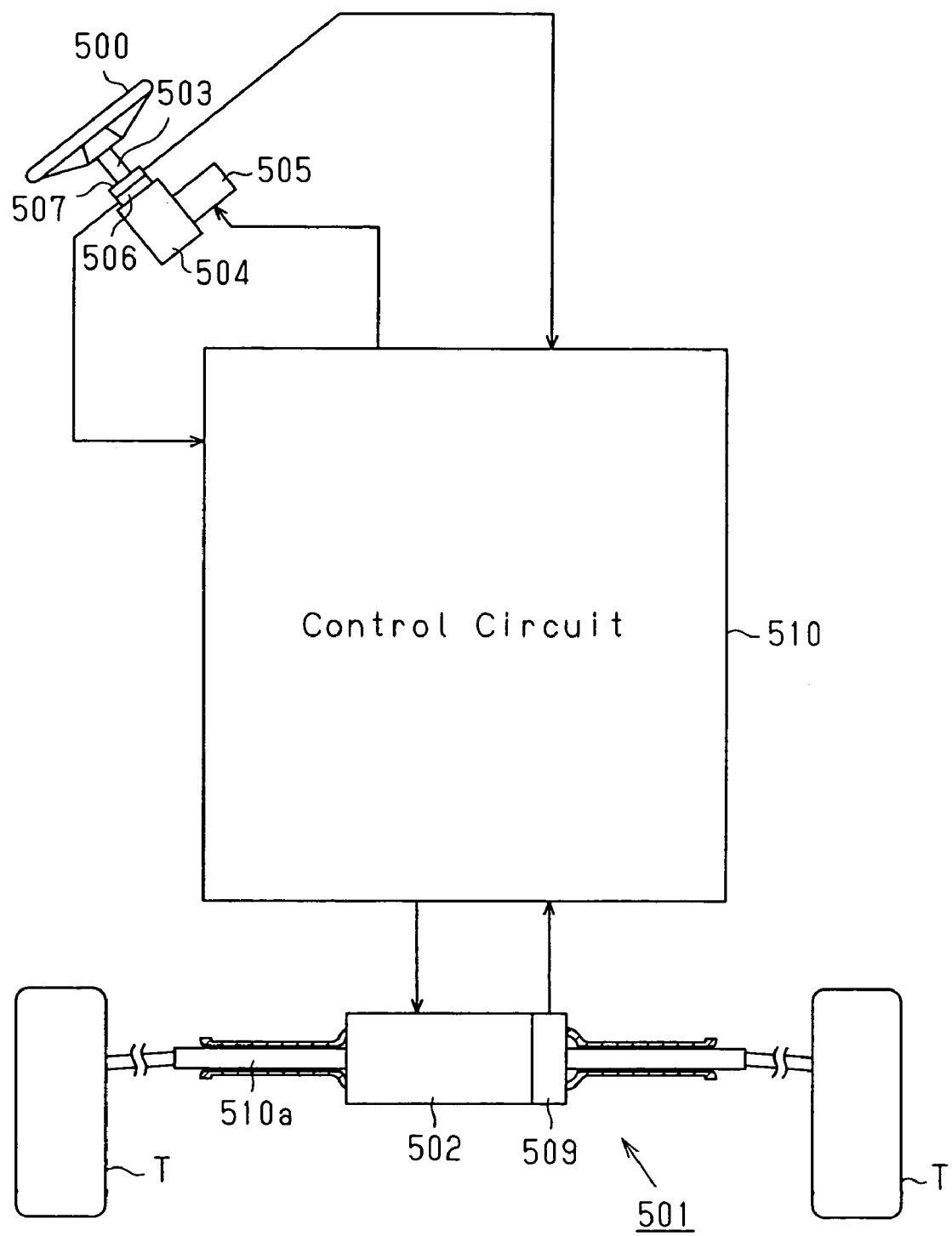
FIG. 8 is a schematic diagram showing an entire steering apparatus of a prior art.

A block diagram showing a control system of the steering apparatus of this embodiment is shown in FIG. 7. In the construction in FIG. 7, the components corresponding to those shown in FIG. 6 are given the same names and reference numerals and characters. In the construction in FIG. 7, there is no influence of the phase delay by the elastic member (torsion bar 13) from the steering reaction force Tr to the steering wheel angle θh, and therefore the phase margin is larger than the case in FIG. 6, thereby making the control system stable. The value of gradient coefficient Gm of the reaction force map can be made large.

This embodiment provides the following advantages.

(1) In the steer-by-wire steering apparatus of this embodiment, when the steering wheel 10 is steered, the steering wheel angle is obtained based on the rotation angle detected by the rotation angle sensor 19 of the reaction force motor 14. The rotation angle sensor 19 is provided at the secondary side of the torsion bar 13 (elastic member). That is, the object of detection by the rotation angle sensor 19 is a portion closer to the secondary side than the torque sensor 18 is to the secondary side. Based on the steering wheel angle, the first ECU 310 of the control section 300 constructing the control system generates the steered wheel position command indicating the target steered wheel position. The first ECU 310 performs position feedback control of the steering mechanism 200 to eliminate the deviation between the steered wheel position command and the actual steered position (actual steered wheel angle) of the steered wheels T detected by the first rotation angle sensor 221.

Meanwhile, the steering rod force generated at the rod 213 is computed at the control section 300, and the reaction torque calculated based on this steering rod force is applied to the steering wheel 10 from the reaction force motor 14.

As a result, unlike the prior art, occurrence of the phase difference between the rotation angle sensor 19 detecting the rotation angle corresponding to the steering wheel angle and the reaction force motor 14 is restrained as much as possible, and as a result, control delay is restrained. Therefore, adverse effect occurring to the control loop of the control section 300 due to the control delay is restrained.

It is made possible to take large value of the gradient coefficient Gm of the reaction force map, and the feel of the steering reaction force equivalent to the conventional mechanically connected steering apparatus is realized.

(2) The speed reducing mechanism 15 for decelerating the rotation of the reaction force motor 14 is provided between the reaction force motor 14 and the torsion bar 13. Therefore, at the secondary side of the torsion bar 13, the advantage of (1) is obtained even if the rotation angle sensor 19, which functions as the steering wheel position sensor is located at any part including the speed reducing mechanism 15.

(3) The rotation angle sensor 19 detects the rotation angle of the output shaft of the reaction force motor 14 (reaction force actuator). As a result, the steering wheel angle is computed by dividing the rotation angle detected by the rotation angle sensor 19 by the reduction ratio of the speed reducing mechanism 15, and therefore the resolution of the steering wheel angle is enhanced. In this manner, the resolution of the steering wheel angle can be enhanced by providing the rotation angle sensor 19 closer to the reaction force motor 14 than the speed reducing mechanism 15 is to the reaction force motor 14.

For example, when the steering wheel angle sensor is provided at the primary side of the torsion bar 13, if the steering wheel angle having the resolution as high as this embodiment is to be detected, it is necessary to use a costly steering wheel angle sensor. In this embodiment, the rotation angle sensor 19 may have low resolution, and inexpensive rotation angle sensor can be used.

A second embodiment will now be described with reference to FIG. 3. The insides of the first ECU 310 and the second ECU 320 defined by the alternate long and short dash lines in FIG. 3 show control blocks, and do not show the hardware structure.

In other words, the hardware structure also includes a manipulation mechanism 100 including a steering wheel 10, a steering mechanism 200 and a control section 300 in the second embodiment as in the first embodiment. The following structure differs from that of the first embodiment.

Figure 3:
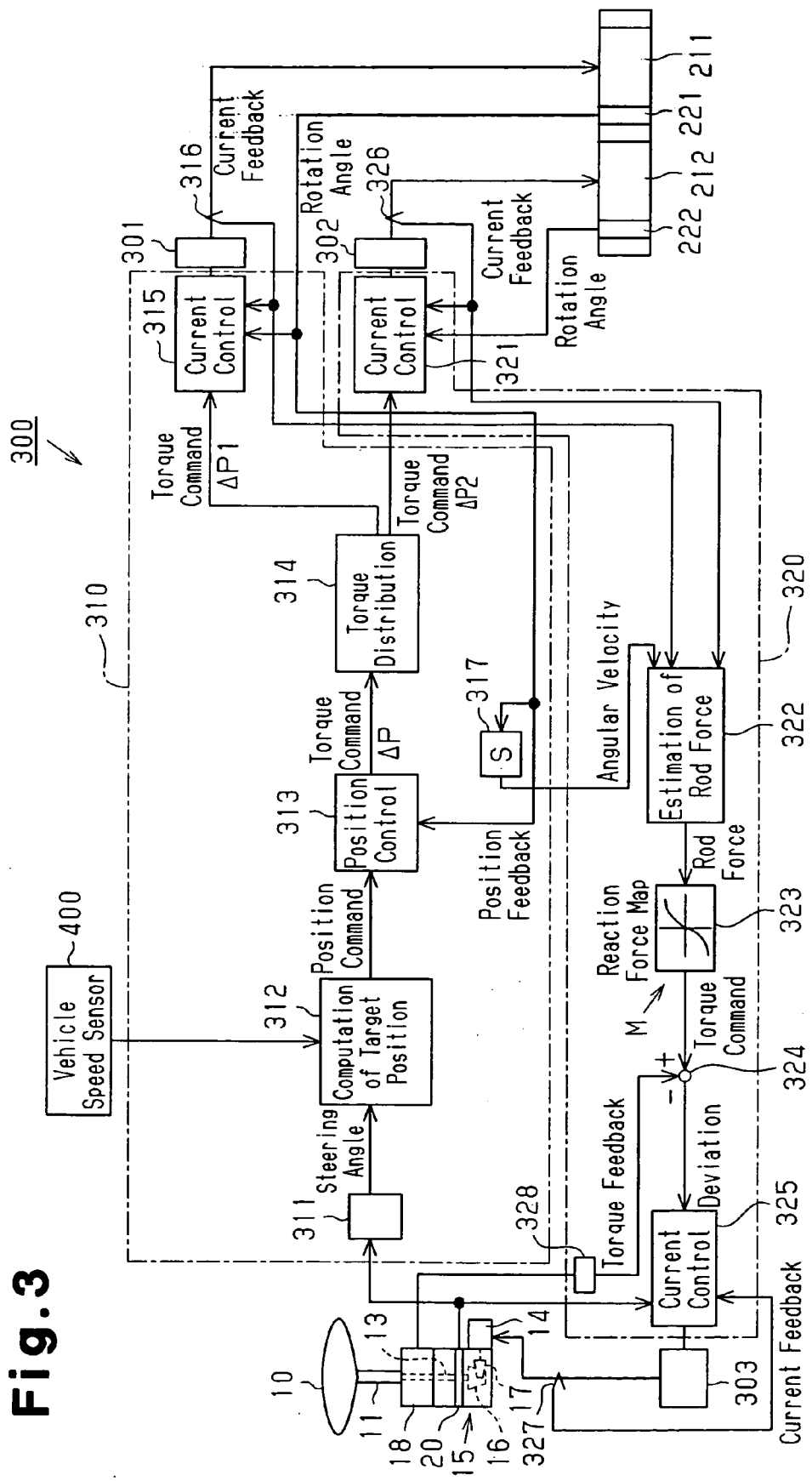
FIG. 3 is a schematic diagram showing a control block of a steering apparatus according to a second embodiment of the present invention.
Figure 4:
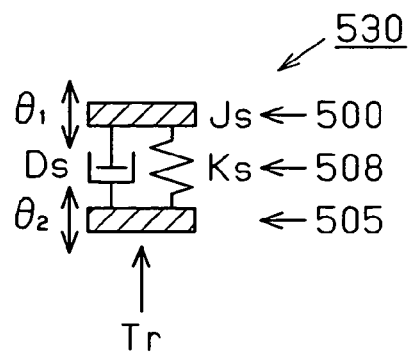
FIG. 4 is an explanatory diagram of a spring vibration system.
Figure 5A:
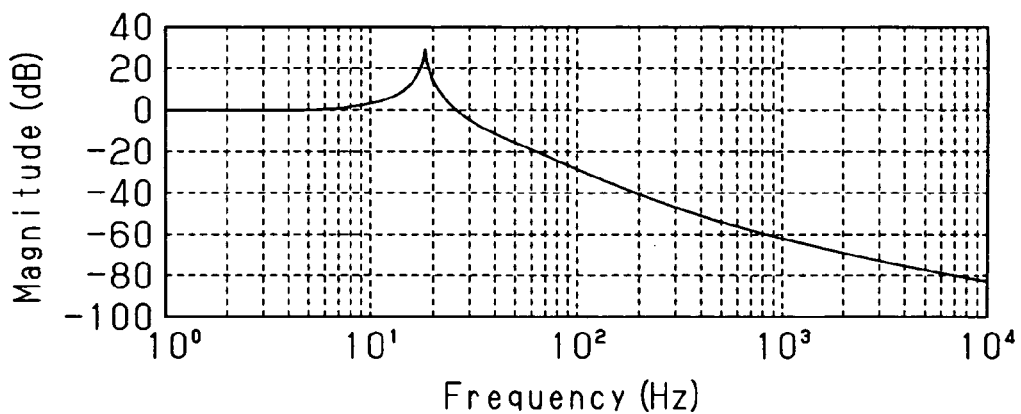
FIG. 5(a) is a frequency-magnitude plot of a spring vibration system.
Figure 5B:
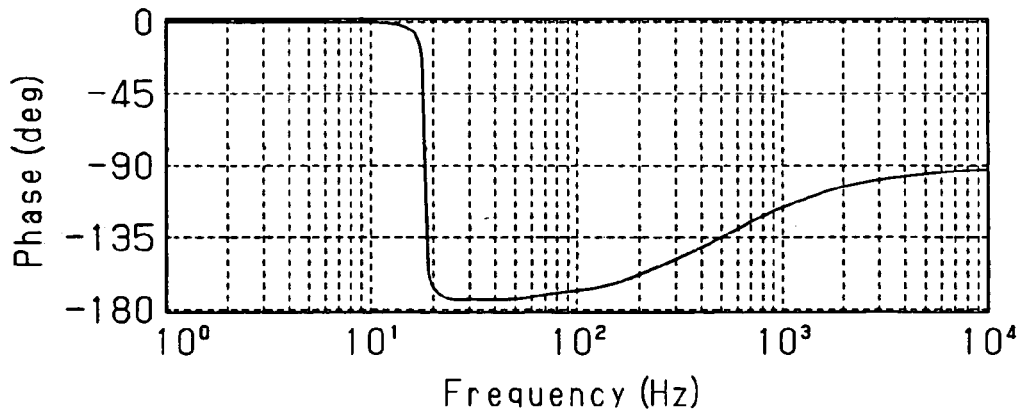
FIG. 5(b) is a frequency-phase plot of the spring vibration system.

In the second embodiment, the rotation angle sensor 19 is deleted as shown in FIG. 3. The steering wheel angle sensor 20 is disposed at the secondary side of the torsion bar 13. The steering wheel angle sensor 20 is disposed so that the rotation of the connecting portion of the large gear 16 in the speed reducing mechanism 15 and the torsion bar 13 are detectable. The steering wheel angle sensor 20 is capable of detecting the steering wheel angle in an absolute angle. In other words, when the steering wheel 10 is turned, the steering wheel angle sensor 20 detects a rotation angle of a portion of the torsion bar 13 that is close to the speed reducing mechanism 15 as a steering wheel position. That is, the torsion bar 13 has a portion coupled to the speed reducing mechanism 15, and the steering wheel angle sensor 20 detects the rotation angle of the coupled portion. The steering wheel angle sensor 20 inputs a steering wheel angle detection signal into the first ECU 310.

As shown in FIG. 3, the processing in the steering wheel angle computing section 311 differs from the first embodiment among the means (the sections) realized by the first ECU 310 of the second embodiment in accordance with the control program. Specifically, the steering wheel angle computing section 311 computes the steering wheel angle (steering wheel position) of the turned steering wheel 10 from the straight-ahead position (neutral position) based on the steering wheel angle detection signal of the steering wheel angle sensor 20.

The other components are the same as in the first embodiment, and therefore the same components are given the identical reference numerals and characters to omit the explanation The second embodiment has the same advantage as the (1) of the first embodiment.

The embodiments of the present invention are not limited to the above-described embodiments, and may be modified as follows.

In the first embodiment, the rotation angle sensor 19 includes the pulse encoder. Instead of this, various kinds of sensors such as a resolver, a Hall device, and a photo-electric element may be used as the rotation angle sensor 19.

In the aforesaid embodiments, the first rotation angle sensor 221 and the second rotation angle sensor 222 include rotary encoders, but they may be embodied as other rotation displacement detector, for example, resolver as long as they have a predetermined electric angle with the steering motors 211 and 212 and detect the rotation displacement of the motors 211 and 212.

In the aforesaid first embodiment, the rotation angle sensor 19 is disposed at the outer end portion of the reaction force motor 14, but it may be disposed at a portion of the output shaft of the reaction force motor 14 that is coupled to the speed reducing mechanism 15. The same advantages as the first embodiment are also provided by disposing the rotation angle sensor 19 in this manner.

In the aforesaid embodiments, the torque command ΔP computed by the first system SY1 is distributed, and the first ECU 310 and the second ECU 320 perform torque control based on the corresponding distributed torque command ΔP1 and ΔP2. Instead of this, only one of the steering motors 211, 212 is controlled to control the steering mechanism 200 with only one of the systems SY1, SY2 as a main system at an ordinary mode (normal mode). When the main system fails, the other remaining system functions as a backup and controls the steering mechanism 200.

The elastic member is not limited to the torsion bar 13, but may be a member such as a coil spring that exhibits elastic motion.

In the aforesaid embodiments, the rod force is estimated by the rod force estimating section 322, but a rod force sensor for detecting the rod force may be additionally provided.

The present examples and embodiments are to be considered as illustrative and not restrictive and the invention is not to be limited to the details given herein, but may be modified within the scope and equivalence of the appended claims.

What is claimed is:

1. A steering apparatus for a vehicle having a steering wheel, the apparatus comprising:
   a steering mechanism that is mechanically separate from the steering wheel, wherein the steering mechanism includes a steering rod and a steering actuator, wherein the steering actuator drives the steering rod;
   a steering wheel position detector for detecting a steering position of the steering wheel;
   a control system that determines a target steered position of the steering rod based on the detected steering position of the steering wheel, wherein the control system performs feedback control of the steering actuator based on the target steered position and an actual steered position of the steering rod;

a reaction force actuator, wherein the reaction force actuator applies reaction force to the steering wheel based on force that the steering mechanism receives from a road; and an elastic member that couples the reaction force actuator to the steering wheel, wherein the elastic member is located between the steering wheel and the reaction force actuator, and wherein, with respect to the elastic member, a side closer to the steering wheel is referred to as a primary side, and a side closer to the reaction force actuator is referred to as a secondary side, wherein the steering wheel position detector is located at the secondary side.

2. The apparatus according to claim 1, wherein a speed reducing mechanism is located between the reaction force actuator and the elastic member, and wherein the speed reducing mechanism decelerates rotation of the reaction force actuator.

3. The apparatus according to claim 2, wherein the steering wheel position detector detects as the steering wheel position a rotation angle of a portion of the elastic member that is close to the speed reducing mechanism.

4. The apparatus according to claim 1, further comprising a torque detector that detects elastic deformation of the elastic member, thereby obtaining steering torque applied to the steering wheel, wherein the object of detection by the steering wheel position detector is a portion that is closer to the secondary side than the torque detector is to the secondary side.

5. The apparatus according to claim 1, wherein the elastic member is a torsion bar.

6. A steering apparatus for a vehicle having a steering wheel, the apparatus comprising:

a steering mechanism that is mechanically separate from the steering wheel, wherein the steering mechanism includes a steered wheel and a steering actuator, wherein the steering actuator drives the steered wheel;

a steering wheel angle detector for detecting a steering angle of the steering wheel;

a control system that determines a target steered angle of the steered wheel based on the detected steering angle of the steering wheel, wherein the control system performs feedback control of the steering actuator based on the target steered angle and an actual steered angle of the steered wheel;

a reaction force actuator, wherein the reaction force actuator applies reaction force to the steering wheel based on load that the steering actuator receives from a road through the steered wheel; and an elastic member that couples the reaction force actuator to the steering wheel; and a torque detector that detects elastic deformation of the elastic member, thereby obtaining steering torque applied to the steering wheel, wherein the object of detection by the steering wheel angle detector is a portion that is closer to the reaction force actuator than the torque detector is to the reaction force actuator.

7. A steering apparatus for a vehicle having a steering wheel, the apparatus comprising:

a steering mechanism that is mechanically separate from the steering wheel, wherein the steering mechanism includes a steering rod and a steering actuator, wherein the steering actuator drives the steering rod;

a steering wheel position detector for detecting a steering position of the steering wheel;

a control system that determines a target steered position of the steering rod based on the detected steering position of the steering wheel, wherein the control system performs feedback control of the steering actuator based on the target steered position and an actual steered position of the steering rod;

a reaction force actuator, wherein the reaction force actuator applies reaction force to the steering wheel based on force that the steering mechanism receives from a road; and an elastic member that couples the reaction force actuator to the steering wheel, wherein the elastic member is located between the steering wheel and the reaction force actuator, and wherein, with respect to the elastic member, a side closer to the steering wheel is referred to as a primary side, and a side closer to the reaction force actuator is referred to as a secondary side, wherein the steering wheel position detector is located at the secondary side, wherein a speed reducing mechanism is located between the reaction force actuator and the elastic member, wherein the speed reducing mechanism decelerates rotation of the reaction force actuator, and wherein the steering wheel position detector is located between the elastic member and the speed reducing mechanism.

8. A steering apparatus for a vehicle having a steering wheel, the apparatus comprising:

a steering mechanism that is mechanically separate from the steering wheel, wherein the steering mechanism includes a steering rod and a steering actuator, wherein the steering actuator drives the steering rod;

a steering wheel position detector for detecting a steering position of the steering wheel;

a control system that determines a target steered position of the steering rod based on the detected steering position of the steering wheel, wherein the control system performs feedback control of the steering actuator based on the target steered position and an actual steered position of the steering rod;

a reaction force actuator, wherein the reaction force actuator applies reaction force to the steering wheel based on force that the steering mechanism receives from a road; and an elastic member that couples the reaction force actuator to the steering wheel, wherein the elastic member is located between the steering wheel and the reaction force actuator, and wherein, with respect to the elastic member, a side closer to the steering wheel is referred to as a primary side, and a side closer to the reaction force actuator is referred to as a secondary side, wherein the steering wheel position detector is located at the secondary side, wherein a speed reducing mechanism is located between the reaction force actuator and the elastic member, wherein the speed reducing mechanism decelerates rotation of the reaction force actuator, wherein the steering wheel position detector detects as the steering wheel position a rotation angle of a portion of the elastic member that is close to the speed reducing mechanism, and wherein the elastic member has a portion coupled to the speed reducing mechanism, and wherein the steering wheel position sensor detects a rotation angle of the coupled portion.

9. A steering apparatus for a vehicle having a steering wheel, the apparatus comprising:

a steering mechanism that is mechanically separate from the steering wheel, wherein the steering mechanism includes a steering rod and a steering actuator, wherein the steering actuator drives the steering rod;

a steering wheel position detector for detecting a steering position of the steering wheel;

a control system that determines a target steered position of the steering rod based on the detected steering position of the steering wheel, wherein the control system performs feedback control of the steering actuator based on the target steered position and an actual steered position of the steering rod;

a reaction force actuator, wherein the reaction force actuator applies reaction force to the steering wheel based on force that the steering mechanism receives from a road; and an elastic member that couples the reaction force actuator to the steering wheel, wherein the elastic member is located between the steering wheel and the reaction force actuator, and wherein, with respect to the elastic member, a side closer to the steering wheel is referred to as a primary side, and a side closer to the reaction force actuator is referred to as a secondary side, wherein the steering wheel position detector is located at the secondary side, wherein a speed reducing mechanism is located between the reaction force actuator and the elastic member, wherein the speed reducing mechanism decelerates rotation of the reaction force actuator, and wherein the steering wheel position detector detects a rotation angle of an output shaft of the reaction force actuator.

10. A steering apparatus for a vehicle having a steering wheel, the apparatus comprising:

a steering mechanism that is mechanically separate from the steering wheel, wherein the steering mechanism includes a steering rod and a steering actuator, wherein the steering actuator drives the steering rod;

a steering wheel position detector for detecting a steering position of the steering wheel;

a control system that determines a target steered position of the steering rod based on the detected steering position of the steering wheel, wherein the control system performs feedback control of the steering actuator based on the target steered position and an actual steered position of the steering rod;

a reaction force actuator, wherein the reaction force actuator applies reaction force to the steering wheel based on force that the steering mechanism receives from a road; and an elastic member that couples the reaction force actuator to the steering wheel, wherein the elastic member is located between the steering wheel and the reaction force actuator, and wherein, with respect to the elastic member, a side closer to the steering wheel is referred to as a primary side, and a side closer to the reaction force actuator is referred to as a secondary side, wherein the steering wheel position detector is located at the secondary side, and wherein the steering wheel position detector detects a rotation angle of an output shaft of the reaction force actuator.

* * * * *